United States Patent
Wu et al.

(10) Patent No.: US 12,021,474 B2
(45) Date of Patent: Jun. 25, 2024

(54) MOTOR CONTROL AND DEMAGNETIZATION BALANCE VIA PWM SIGNALS

(71) Applicant: Infineon Technologies Austria AG, Villach (AT)

(72) Inventors: Wei Wu, Rancho Palos Verdes, CA (US); Venkata Anand Prabhala, El Segundo, CA (US)

(73) Assignee: Infineon Technologies Austria AG, Villach (AT)

( * ) Notice: Subject to any disclaimer, the term of this patent is extended or adjusted under 35 U.S.C. 154(b) by 171 days.

(21) Appl. No.: 17/522,369

(22) Filed: Nov. 9, 2021

(65) Prior Publication Data
US 2023/0142567 A1     May 11, 2023

(51) Int. Cl.
| H02P 6/28 | (2016.01) |
| H02P 6/12 | (2006.01) |
| H02P 6/15 | (2016.01) |
| H02P 6/16 | (2016.01) |

(52) U.S. Cl.
CPC ............... *H02P 6/15* (2016.02); *H02P 6/12* (2013.01); *H02P 6/16* (2013.01)

(58) Field of Classification Search
CPC .... H02P 6/28; H02P 6/157; H02P 6/12; H02P 6/16; H02P 6/15
USPC ..................................................... 318/400.01
See application file for complete search history.

(56) References Cited

U.S. PATENT DOCUMENTS

| 10,374,533 B2 | 8/2019 | Prabhala et al. | |
| 11,088,643 B1* | 8/2021 | Han | .................. H02P 21/24 |
| 2019/0157994 A1* | 5/2019 | Prabhala | ............... H02P 6/15 |
| 2020/0186144 A1* | 6/2020 | Balakrishnan | ........... H03K 4/06 |

FOREIGN PATENT DOCUMENTS

| EP | 3493393 A1 | 6/2019 |
| EP | 3876419 A1 | 9/2021 |

OTHER PUBLICATIONS

Extended European Search Report, EP 22 20 5773, Mar. 20, 2023, pp. 1-10.
STM: "PWM Management for 3 Phase BLDC Motor Drives Using the ST7MC", Internet Citation, Dec. 31, 2007 (Dec. 31, 2007), pp. 1-39, X2002790677, Retrieved from the Internet: URL:https://www.st.com/content/ccc/resourc e/technical/document/application_note/5d/0 4/eb/5e/87/77/48/cb/CD00041736.pdf/files/CD00041736.pdf/jcr:content/translations/en. CD00041736.pdf [retrieved on Apr. 16, 2019].
Zeljko Grbo et al: "Cost-optimized switched reluctance motor drive with bipolar currents", Electrical Engineering ; Archiv Für Elektrotechnik, Springer, Berlin, DE, vol. 89, No. 3, Dec. 28, 2005 (Dec. 28, 2005), pp. 183-191, XP019457878.

* cited by examiner

*Primary Examiner* — Gabriel Agared
(74) *Attorney, Agent, or Firm* — Armis IP Law, LLC

(57) ABSTRACT

An example apparatus as discussed herein includes a controller. The controller receives control input indicating how to control operation of a motor. In accordance with the control input, the controller controls a corresponding flow of current through each of multiple windings of the motor. According to one implementation, the controller balances positive demagnetization and negative demagnetization of each of the multiple windings in a respective control cycle.

23 Claims, 12 Drawing Sheets

Voltage equation of three phase permanent magnet motor:
$V_{nc} = V_U - V_{L\_U} - I_U*R - e_U$
$V_{nc} = V_V - V_{L\_V} - I_V*R - e_V$
$V_{nc} = V_W - V_{L\_W} - I_W*R - e_W$ In balanced three phase system:
$V_{L\_U} + V_{L\_V} + V_{L\_W} = 0$
$I_U + I_V + I_W = 0$
$e_U + e_V + e_W = 0$ Add three phase voltage equation together:
$V_{nc} = (V_U + V_V + V_W)/3$ Current demagnetization speed is decided by voltage applied to phase inductor L:
$dI/dt = V/L$

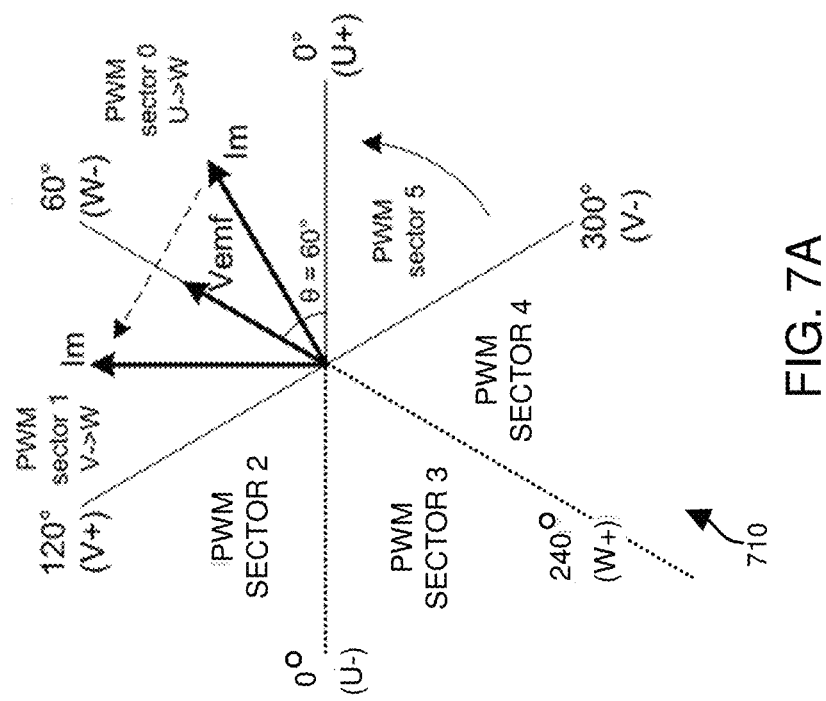
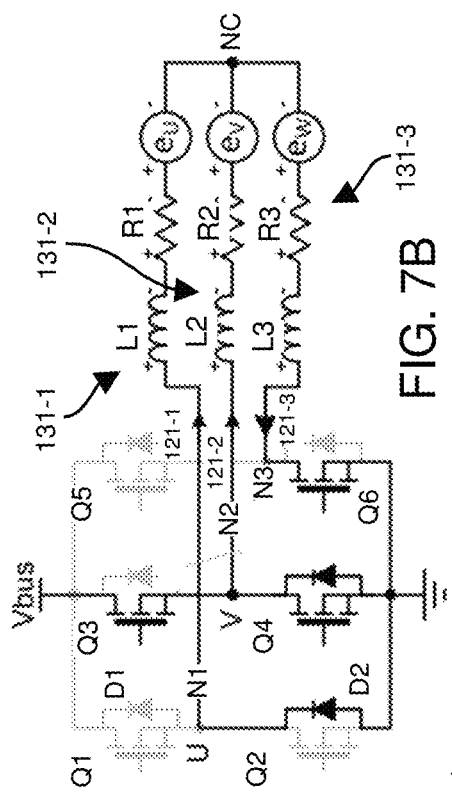
FIG. 7B
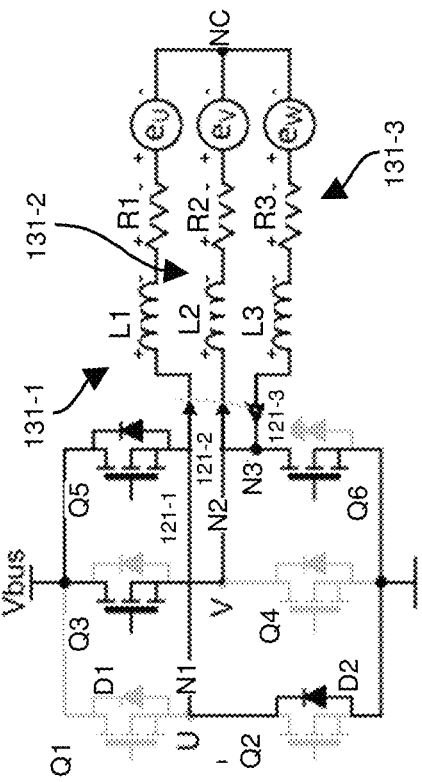
FIG. 7C
FIG. 7A

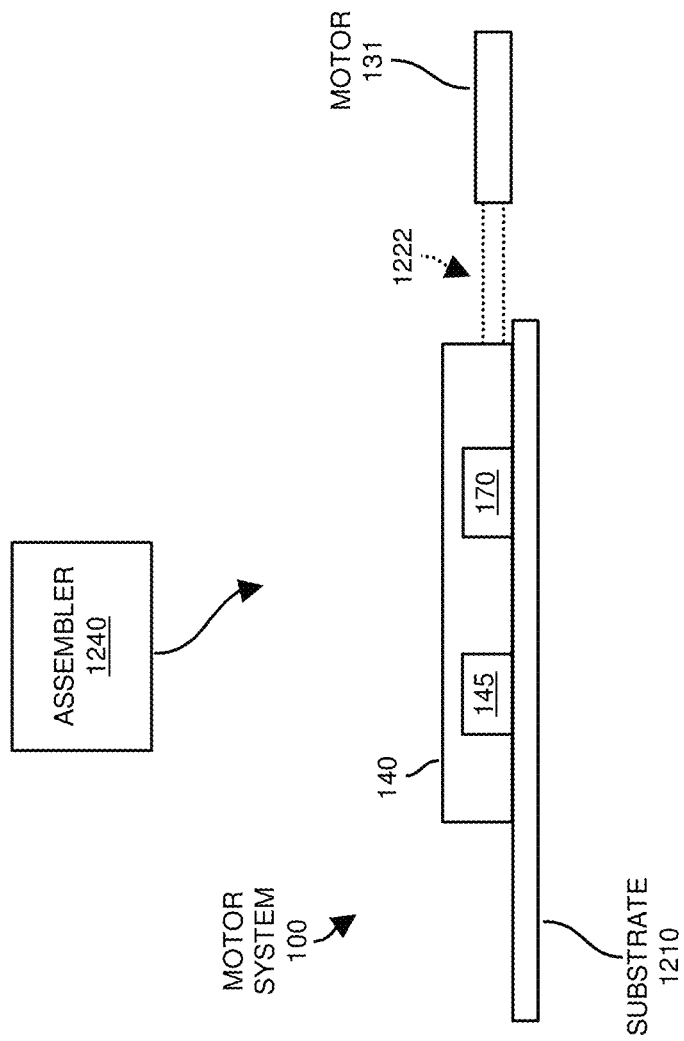

MOTOR CONTROL AND DEMAGNETIZATION BALANCE VIA PWM SIGNALS

BACKGROUND

Implementation of conventional brushless DC motors (a.k.a., BLDC motors) are susceptible to imbalance of power losses. For example, implementation of a conventional BLDC pulse width modulation drive scheme results in unevenly distributed power dissipation between respective high side switch circuitry and low side switch circuitry controlling the flow of current through windings of the motor during winding demagnetization, which occurs twice per control cycle. For example, the implementation of conventional BLDC pulse width modulation drive schemes shows inconsistent rates of rising and falling during positive and negative demagnetization of respective motor windings. Slower demagnetization times results in higher power losses.

Conventional motor applications include implementation of software to speed-up demagnetization of respective windings. However, ideal demagnetization times vary depending on one or more factors such as motor speed, DC bus voltage, and load conditions.

BRIEF DESCRIPTION

In contrast to conventional techniques, this disclosure includes novel ways of improving positive demagnetization and negative demagnetization of windings in a motor.

More specifically, an apparatus and/or system may include a controller. The controller may receive control input indicating how to control operation of a motor. In accordance with the control input, the controller may control a corresponding flow of current through at least one of multiple windings of the motor. While controlling the corresponding flow of current through each of the multiple windings, the controller may balance positive demagnetization (such as a mode of reducing the amount of positive magnetic flux in the at least one winding to zero) and negative demagnetization (such as a mode of reducing the amount of negative magnetic flux in the at least one winding to zero) of the at least one winding in a respective control cycle.

Further, the controller may control a rate of the positive demagnetization and a rate of the negative demagnetization of the at least one winding in the respective control cycle to be substantially equal.

Yet further, the controller may control a time duration of the positive demagnetization and a time duration of the negative demagnetization of the at least one winding in the respective control cycle to be substantially equal of each other. Thus, in such an instance, the controller may substantially equalize a duration of the positive demagnetization to a duration of the negative demagnetization of one or more of the multiple windings in the respective control cycle.

The controller may be further operative to control a magnitude of a duration of the negative demagnetization of the at least one winding in the respective control cycle to be within a threshold value of 5% (or other suitable value such as 1%, 3%, 10%, etc.) of a magnitude of the duration of the positive demagnetization. For example, if the duration of the positive demagnetization of a first winding is 100 microseconds, and the threshold value is 5%, the controller may control the magnitude of the duration of the negative demagnetization of the winding in the respective cycle to be between 95 and 105 microseconds, or vice versa.

Still further, the controller may control current through each of the multiple windings of the motor such that an average magnitude of the current through each of the multiple windings is substantially equal during the respective control cycle.

Yet further, a node of each of the multiple windings of the motor may be electrically connected to a common node. The controller may control a magnitude of a voltage across a first winding of the multiple windings to a first value during positive demagnetization of the first winding in the respective control cycle; the controller may control a magnitude of the voltage across the first winding to a second value during negative demagnetization of the first winding. A magnitude of the second value substantially equal to a magnitude of the first value.

As previously discussed, the controller may implement balancing of the positive demagnetization and the negative demagnetization of each of the multiple windings in the respective control cycle. The balancing of the positive demagnetization and the negative demagnetization may equalize power losses (and corresponding heat dissipation) associated with high side switch circuitry and low side switch circuitry providing the current through each of the multiple windings of the motor in the respective control cycle.

Additionally, note that the apparatus as discussed herein may include multiple current drivers such as associated with an inverter. The multiple current drivers (each including high side switch circuitry and low side switch circuitry) may be controlled by the controller and supply the current through each of the multiple windings of the motor.

Yet further, the multiple windings of the motor may include a first winding, a second winding, and a third winding. A first node of the first winding, a first node of the second winding, and a first node of the third winding may be electrically connected to each other at a common electrical node of the motor.

The at least one winding as discussed herein may be a first winding. During the positive demagnetization, in order to decrease a magnitude of magnetic flux in the first winding, the controller may: i) deactivate switches coupled to a node of the first winding to zero; ii) apply a bus voltage to a node of the second winding; and iii) switch between applying the bus voltage to a node of the third winding and applying a reference voltage associated with the bus voltage to the node of the third winding in accordance with a first duty cycle (D).

During the negative demagnetization, in order to decrease the magnitude of magnetic flux in the first winding, the controller may: i) deactivate the switches coupled to the node of the first winding to zero; ii) apply the reference voltage to the node of the second winding; and iii) switch between applying the bus voltage to the node of the third winding and applying the reference voltage to the node of the third winding in accordance with a second duty cycle (1-D).

Yet further, deactivation of the switches coupled to the first winding during the positive demagnetization may cause an inherent diode of a first switch of the switches to provide electrical connectivity of the node of the first winding to the reference voltage during the positive demagnetization of the first winding; deactivation of the switches coupled to the first winding during the negative demagnetization may cause an inherent diode of a second switch of the switches to provide electrical connectivity of the node of the first winding to the bus voltage during the negative demagnetization of the first winding. The first switch and the second switch may be connected in series between a first voltage source supplying the bus voltage and a second voltage source supplying the reference voltage (such as a ground reference voltage).

Implementation of pulse width modulation as discussed herein may provide beneficial operation such as one or more of the following: i) evenly distributed power dissipation amongst high side switch circuitry and low side switch circuitry on each motor phase, ii) during commutation (switch from one PWM sector to another), demagnetization time of non-excited phases becomes shorter, which helps reduce the loss, iii) during commutation, current rising time of new excited phase becomes shorter, which helps increase BLDC motor control efficiency.

These and other more specific concepts are disclosed in more detail below.

Note that although techniques as discussed herein are applicable to controlling current through multiple windings, the concepts disclosed herein may be advantageously applied in any suitable application.

Note further that any of the resources as discussed herein may can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different techniques as described herein.

Yet other implementations herein may include software programs to perform the steps and operations summarized above and disclosed in detail below. One such implementation comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, this disclosure is directed to one or more of methods, systems, computer program products, etc., that support operations as discussed herein.

A computer readable storage medium and/or system may have instructions stored thereon. The instructions, when executed by computer processor hardware, may cause the computer processor hardware (such as one or more co-located or disparately located processor devices) to: receive control input; in accordance with the control input, control current through each of multiple windings of a motor; and balance positive demagnetization and negative demagnetization of at least one of the multiple windings in a respective control cycle of controlling the current.

The ordering of the steps above has been added for clarity sake. Note that any of the processing operations as discussed herein can be performed in any suitable order.

Further techniques herein may include software programs and/or respective hardware to perform any of the methods including steps and/or operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of controlling current through windings of motor to provide torque in respective movement of a motor shaft. However, it should be noted that this disclosure is not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be implemented and viewed in many different ways.

Also, note that this preliminary discussion herein (BRIEF DESCRIPTION) purposefully does not specify every implementation and/or incrementally novel aspect of the present disclosure or claimed invention(s). Instead, this brief description only presents general implementations and corresponding points of novelty over conventional techniques. For additional details and/or possible perspectives (permutations) of the invention(s), the reader is directed to the Detailed Description section (which is a summary of possible implementation and operations) and corresponding figures of the present disclosure as further discussed below.

BRIEF DESCRIPTION OF THE DRAWINGS

FIG. 7A is an example diagram illustrating operation of the motor during positive demagnetization.

FIG. 7B is an example diagram illustrating implementation of a conventional pulse width modulation drive pattern.

FIG. 7C is an example diagram illustrating implementation of a pulse width modulation drive pattern.

FIG. 12 is an example diagram illustrating assembly of a circuit as discussed herein.

Figure 1:
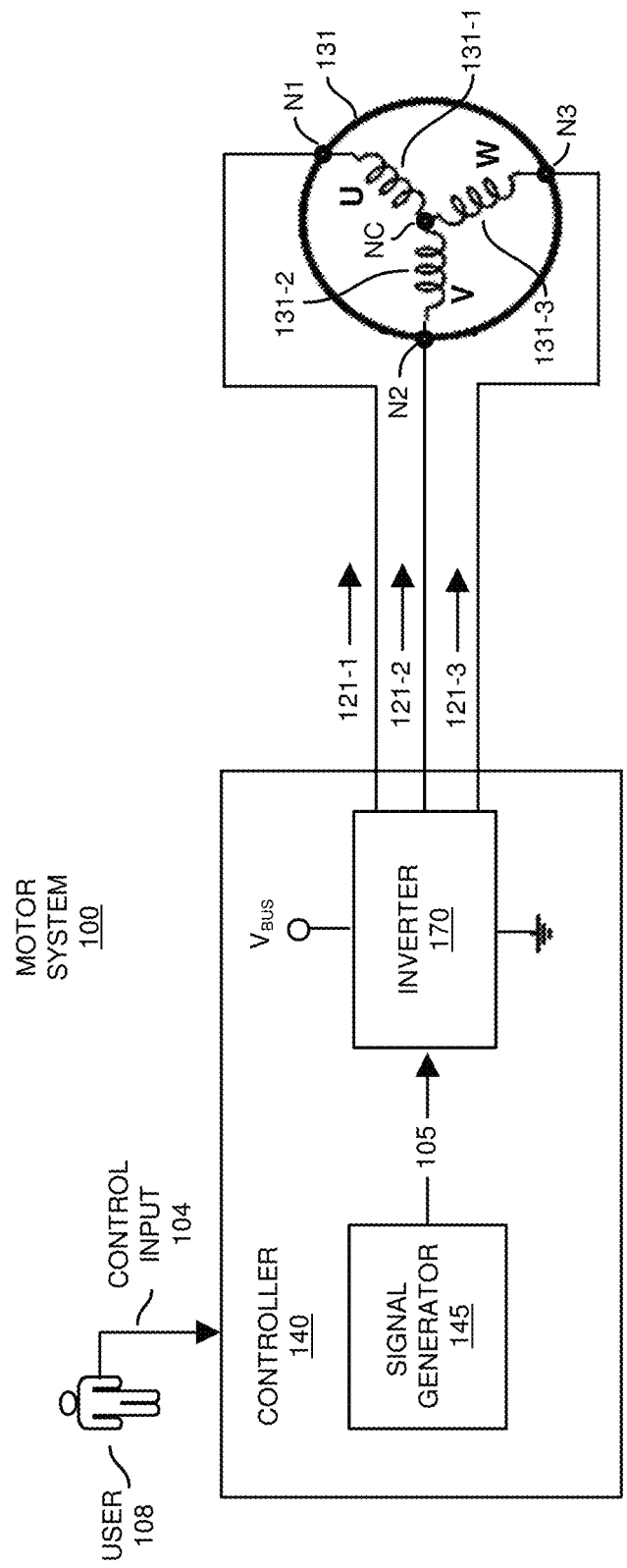
FIG. 1 is an example general diagram of a motor and corresponding control system.

The foregoing and other objects, features, and advantages of the invention will be apparent from the following more particular description of preferred implementations herein, as illustrated in the accompanying drawings in which like reference characters refer to the same parts throughout the different views. The drawings are not necessarily to scale, with emphasis instead being placed upon illustrating the implementations, operations, principles, concepts, etc.

DETAILED DESCRIPTION

Now, more specifically, FIG. 1 is an example general diagram of a motor control system.

As shown, the motor system 100 (motor system or other suitable type system including one or more windings) includes controller 140 that controls operation of the motor 131. The motor 131 can be configured to include any number of windings. In this non-limiting example, motor 131 includes multiple windings such as winding 131-1, winding 131-2, and winding 131-3.

Motor 131 can be any type of motor. For example, motor 131 can be PMSM (Permanent Magnet Synchronous Motor), BLDC (Brushless DC Motor), ACIM (AC Induction Motor) motor, etc.

Further, one end of each of the windings of motor 131 is connected to a respective common node NC. For example, the winding 131-1 is connected between the node N1 and the common node NC; the winding 131-2 is connected between the node N2 and the common node NC; the winding 131-3 is connected between the node N3 and the common node NC.

The inverter 170 can be configured to include one or more switches. The switches in inverter 170 can be any suitable type such as MOSFETs (Metal Oxide Semiconductor Field Effect Transistors), IGBT (Insulated-Gate Bipolar Transistor), BJT (Bipolar Junction Transistors), etc.

Controller 140 can be configured to further include signal generator 145 and inverter 170 (such as switch circuitry) to drive each of the windings 131-1, 131-2, and 131-3 associated with the motor 131. For example, the controller 140 receives respective control input 104 from the user 108. Based on the control input 104, such as one or more signals indicating how to control operation of the motor 131, the controller 140 operates the signal generator 145 to produce control signals 105. Appropriate timing of control signals 105 controls operation of respective switches in the inverter 170 and variation in the magnitudes of current 121-1, 121-2, and 121-3, resulting a corresponding rotation of a shaft of the motor 131.

Thus, the controller 140 may receive control input 104 indicating how to control operation of motor 131. In accordance with the control input 104, the controller 140 controls a corresponding flow of current 121-1, 121-2, and 121-3 through respective windings 131-1, 131-2, and 131-3 of the motor 131. According to one implementation as further discussed herein, via generation of control signals 105 (such as pulse width modulation signals), the controller 140 balances positive demagnetization and negative demagnetization of each of the multiple windings in a respective control cycle.

Figure 2:
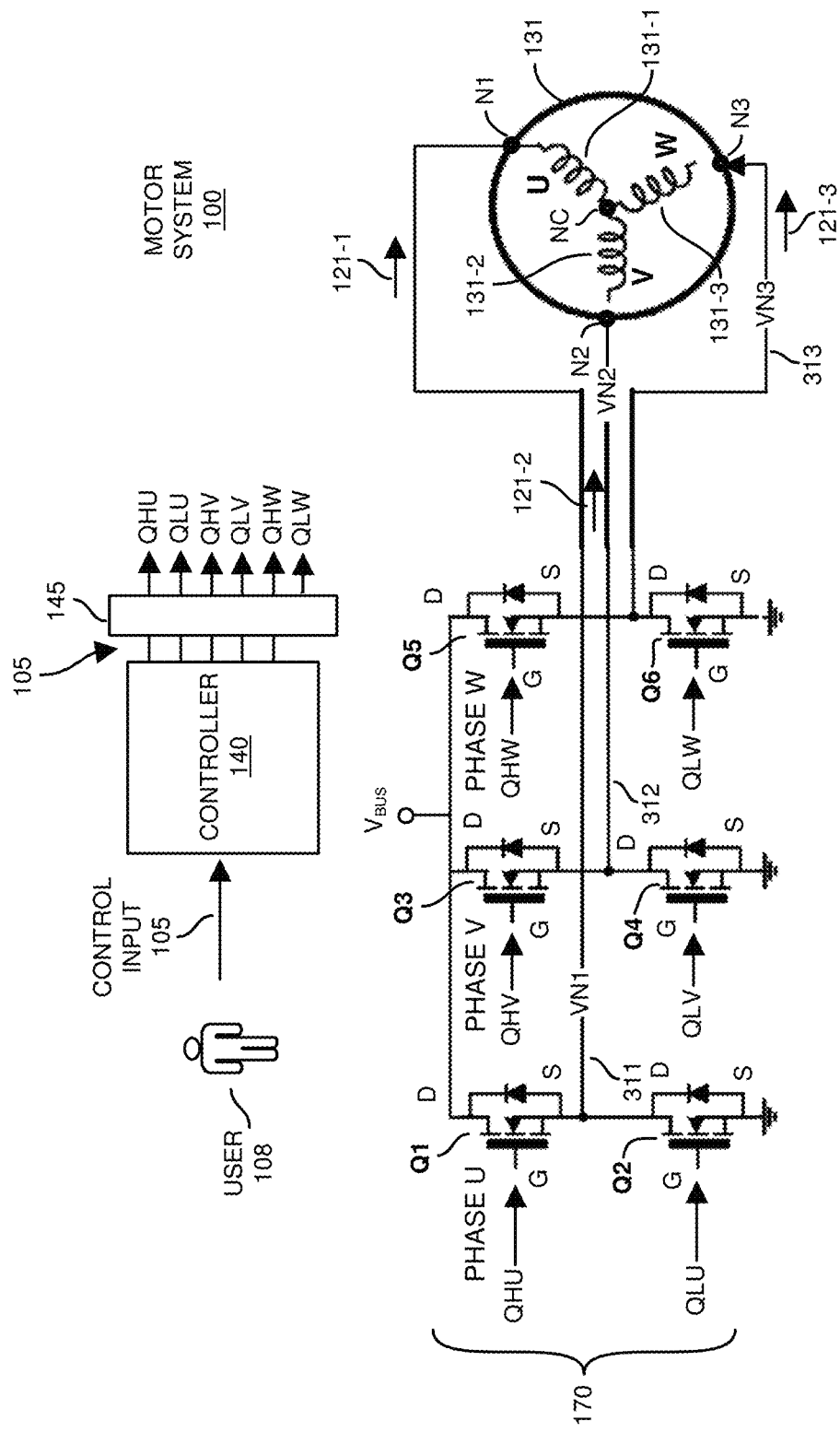
FIG. 2 is an example diagram illustrating details of the motor control system.

FIG. 2 is an example diagram illustrating a motor control system.

In this example, the inverter 170 includes switches (n-channel MOSFETs) such as switch Q1 (such as high side switch circuitry), switch Q2 (such as low side switch circuitry), switch Q3 (such as high side switch circuitry), switch Q4 (such as low side switch circuitry), switch Q5 (such as high side switch circuitry), and switch Q6 (such as low side switch circuitry).

Each of the pairs of switches may control delivery of current to a respective winding of the motor 131. For example, the combination of switches Q1 and Q2 controls the voltage VN1 supplied to node N1 and thus delivery of current 121-1 through the winding 131-1. The combination of switches Q3 and Q4 controls the voltage VN2 supplied to node N2 and thus delivery of current 121-2 through the winding 131-2. The combination of switches Q5 and Q6 controls the voltage VN3 supplied to node N3 and thus delivery of current 121-3 through the winding 131-3.

As shown, the inverter 170 and corresponding circuitry can be configured in any suitable manner. For example, a combination of switch Q1 and switch Q2 can be configured to form a first series path between voltage source Vbus (supply voltage such as 24 VDC or other suitable value) and ground reference voltage (reference voltage). The drain node D of switch Q1 is coupled to the voltage Vbus. The source node of switch Q1 is connected to the drain node of switch Q2. The source node of switch Q2 is connected to a ground reference voltage.

As further shown, a combination of switch Q3 and switch Q4 form a second series path between voltage source Vbus (supply voltage such as 24 VDC or other suitable value) and ground. The drain node D of switch Q3 is coupled to the voltage Vbus. The source node of switch Q3 is connected to the drain node of switch Q4. The source node of switch Q4 is connected to a ground reference voltage.

Yet as further shown, a combination of switch Q5 and switch Q6 form a third series path between voltage source Vbus (supply voltage such as 24 VDC or other suitable value) and ground. The drain node D of switch Q5 is coupled to the voltage Vbus. The source node of switch Q5 is connected to the drain node of switch Q6. The source node of switch Q6 is connected to a ground reference voltage.

As previously discussed, motor 130 includes three windings such as motor winding 131-1, motor winding 131-2, and motor winding 131-3. The sum of current 121-1, 121-2, and 121-3 through all windings 131-1, 131-2, and 131-3 is zero. Hence, if a magnitude of currents through two windings is known, the current in the third winding can be determined from the first two known magnitudes of current.

As previously discussed, nodes of all three windings 131-1, 131-2, and 131-3 are connected together at a common node NC of the motor 131.

Yet further, via generation of the control signals 105, the pulse width modulation generator 145 produces control signals such as Qhu, Qlu, Qhv, Qlv, Qhw, Qlw) applied to respective switches Q1-Q6 to control control an amount of current through the windings. For example, based on control signals 105, the signal generator 145 produces control signals Qhu, Qlu, Qhv, Qlv, Qhw, and Qlw.

The signal generator 145 of controller 140 drives the gate node G of the switch Q1 with control signal Qhu; the signal generator 145 of controller 140 drives the gate node G of the switch Q2 with control signal Qlu; the signal generator 145 of controller 140 drives the gate node G of the switch Q3 with control signal Qhv; the signal generator 145 of controller 140 drives the gate node G of the switch Q4 with control signal Qlv; the signal generator 145 of controller 140 drives the gate node G of the switch Q5 with control signal Qhw; the signal generator 145 of controller 140 drives the gate node G of the switch Q6 with control signal Qlw.

Figure 3:
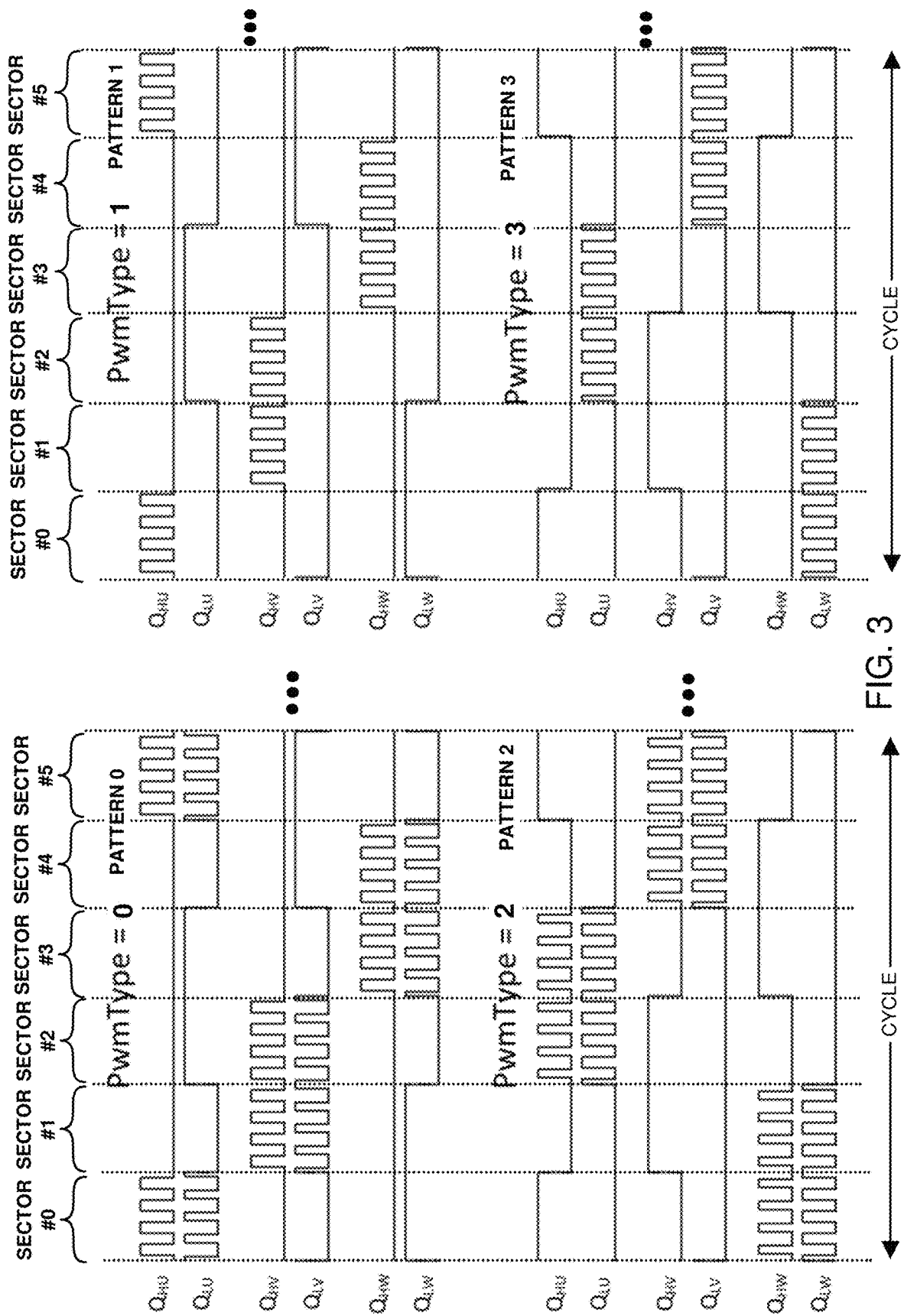
FIG. 3 is an example diagram illustrating different pulse width modulation driver patterns.
Figure 4:
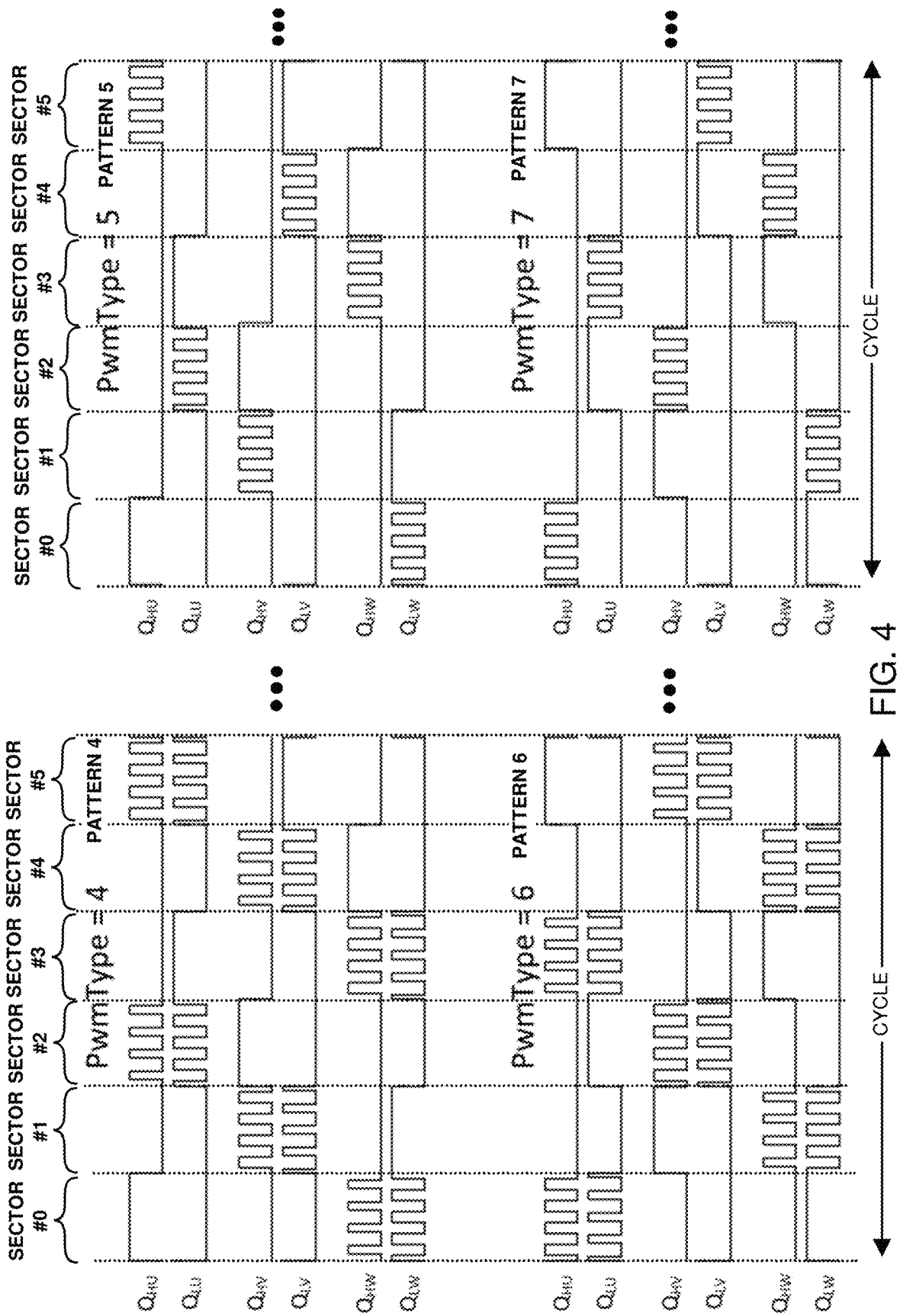
FIG. 4 is an example diagram illustrating a comparison of conventional pulse width modulation patterns and novel driver patterns.

Examples of pulse width modulation controls signals (such as Qhu, Qlu, Qhv,

Qlv, Qhw, Qlw) driving respective gate nodes of the switches of inverter 170 are shown in FIGS. 3 and 4.

FIG. 3 is an example diagram illustrating different conventional pulse width modulation driver patterns.

Each of the pulse width modulation control patterns in FIG. 3 includes six sectors (such as sector #0, sector #1, sector #2, sector #3, sector #4, and sector #5) per control cycle of controlling one revolution of the shaft associated with the motor 131. Each sector corresponds to 60 degrees of rotation. The controller 140 repeats the respective PWM pattern for each of multiple cycles to control operation of the motor 131.

As further shown, the PWM type 0 pattern (also known as pattern 0) indicates settings of respective signals applied to the respective switches of inverter 170. Note that a logic high of a respective signal indicates to activate a corresponding switch (to an ON state, short, or low resistive path) of the inverter 170; a logic low of a respective drive signal indicates to deactivate a corresponding switch (to an OFF state, open circuit path, or high resistive path) of the inverter 170.

Thus, as shown, during sector #0 of PWM pattern 0, the controller 140: i) toggles switches Q1 and Q2 between ON and OFF states; ii) deactivates both of switches Q3 and Q4, and iii) deactivates switch Q5 and activates the switch Q6.

During sector #1 of PWM pattern 0, the controller 140: i) toggles switches Q3 and Q4 between ON and OFF states; ii) deactivates both of switches Q1 and Q2, and iii) deactivates switch Q5 and activates the switch Q6.

During sector #2 of PWM type 0, the controller 140: i) toggles switches Q3 and Q4 between ON and OFF states; ii) deactivates both of switches Q5 and Q6, and iii) deactivates switch Q1 and activates the switch Q2.

During sector #3 of PWM type 0, the controller 140: i) toggles switches Q5 and Q6 between ON and OFF states; ii) deactivates both of switches Q3 and Q4, and iii) deactivates switch Q1 and activates the switch Q2.

During sector #4 of PWM type 0, the controller 140: i) toggles switches Q5 and Q6 between ON and OFF states; ii) deactivates both of switches Q1 and Q2, and iii) deactivates switch Q3 and activates the switch Q4.

During sector #5 of PWM type 0, the controller 140: i) toggles switches Q1 and Q2 between ON and OFF states; ii) deactivates both of switches Q5 and Q6, and iii) deactivates switch Q3 and activates the switch Q4.

For sectors of PWM type 0 in which the controller 140 switches the respective high side switch circuitry and low side switch circuitry ON and OFF, the controller 140 sets the duty cycle of switching depending on how much current is needed to drive the respective windings of motor 131.

PWM pattern 1 operates in a similar manner as PWM type 0 except that the low side switches are not switched between on and off states.

During sector #0 of PWM type 2, the controller 140: i) toggles switches Q5 and Q6 between ON and OFF states; ii) deactivates both of switches Q3 and Q4, and iii) activates switch Q1 and deactivates switch Q2.

During sector #1 of PWM type 2, the controller 140: i) toggles switches Q5 and Q6 between ON and OFF states; ii) deactivates both of switches Q1 and Q2, and iii) activates switch Q3 and deactivates switch Q4.

During sector #2 of PWM type 2, the controller 140: i) toggles switches Q1 and Q2 between ON and OFF states; ii) deactivates both of switches Q5 and Q6, and iii) activates switch Q3 and deactivates switch Q4.

During sector #3 of PWM type 2, the controller 140: i) toggles switches Q1 and Q2 between ON and OFF states; ii) deactivates both of switches Q3 and Q4, and iii) activates switch Q5 and deactivates switch Q6.

During sector #4 of PWM type 2, the controller 140: i) toggles switches Q3 and Q4 between ON and OFF states; ii) deactivates both of switches Q1 and Q2, and iii) activates switch Q5 and deactivates switch Q6.

During sector #5 of PWM type 2, the controller 140: i) toggles switches Q3 and Q4 between ON and OFF states; ii) deactivates both of switches Q5 and Q6, and iii) activates switch Q1 and deactivates switch Q2.

PWM type 3 operates in a similar manner as PWM type 2 except that the low side switches are not switched between on and off states.

FIG. 4 is an example diagram illustrating a comparison of conventional pulse width modulation and novel driver patterns.

Each of the pulse width modulation control patterns in FIG. 4 includes six sectors (such as sector #0, sector #1, sector #2, sector #3, sector #4, and sector #5) per control cycle of controlling one revolution of the shaft associated with the motor 131. Each sector corresponds to 60 degrees of rotation. The controller 140 repeats the respective PWM pattern for each of multiple cycles to control operation of the motor 131.

As further shown, the PWM type 4 pattern indicates signals applied to the respective switches of inverter 170. A logic high of a respective signal indicates to activate a corresponding switch (to an ON state, short, or low resistive path) of the inverter 170; a logic low of a respective drive signal indicates to deactivate a corresponding switch (to an OFF state, open circuit path, or high resistive path) of the inverter 170.

Thus, as shown, during sector #0 of PWM pattern 4, the controller 140: i) toggles switches Q5 and Q6 between ON and OFF states; ii) deactivates both of switches Q3 and Q4, and iii) activates switch Q1 and deactivates the switch Q2.

During sector #1 of PWM type 4, the controller 140: i) toggles switches Q3 and Q4 between ON and OFF states; ii) deactivates both of switches Q1 and Q2, and iii) deactivates switch Q5 and activates the switch Q6.

During sector #2 of PWM type 4, the controller 140: i) toggles switches Q1 and Q2 between ON and OFF states; ii) deactivates both of switches Q5 and Q6, and iii) activates switch Q3 and deactivates the switch Q4.

During sector #3 of PWM type 4, the controller 140: i) toggles switches Q5 and Q6 between ON and OFF states; ii) deactivates both of switches Q3 and Q4, and iii) deactivates switch Q1 and activates the switch Q2.

During sector #4 of PWM type 4, the controller 140: i) toggles switches Q3 and Q4 between ON and OFF states; ii) deactivates both of switches Q1 and Q2, and iii) activates switch Q5 and deactivates the switch Q6.

During sector #5 of PWM type 4, the controller 140: i) toggles switches Q1 and Q2 between ON and OFF states; ii)

deactivates both of switches Q5 and Q6, and iii) deactivates switch Q3 and activates the switch Q4.

For sectors of PWM type 4 in which the controller 140 switches the respective high side switch circuitry and low side switch circuitry ON and OFF, the controller 140 sets the duty cycle of switching switches depending on how much current is needed to drive the respective windings of motor 131.

PWM type 5 operates in a similar manner as PWM type 4 except that the low side switches are not switched between on and off states.

During sector #0 of PWM type 6, the controller 140: i) toggles switches Q1 and Q2 between ON and OFF states; ii) deactivates both of switches Q3 and Q4, and iii) deactivates switch Q5 and activates switch Q6.

During sector #1 of PWM type 2, the controller 140: i) toggles switches Q5 and Q6 between ON and OFF states; ii) deactivates both of switches Q1 and Q2, and iii) activates switch Q3 and deactivates switch Q4.

During sector #2 of PWM type 6, the controller 140: i) toggles switches Q3 and Q4 between ON and OFF states; ii) deactivates both of switches Q5 and Q6, and iii) deactivates switch Q1 and activates switch Q2.

During sector #3 of PWM type 2, the controller 140: i) toggles switches Q1 and Q2 between ON and OFF states; ii) deactivates both of switches Q3 and Q4, and iii) activates switch Q5 and deactivates switch Q6.

During sector #4 of PWM type 6, the controller 140: i) toggles switches Q5 and Q6 between ON and OFF states; ii) deactivates both of switches Q1 and Q2, and iii) deactivates switch Q3 and activates switch Q4.

During sector #5 of PWM type 2, the controller 140: i) toggles switches Q3 and Q4 between ON and OFF states; ii) deactivates both of switches Q5 and Q6, and iii) activates switch Q1 and deactivates switch Q2.

PWM type 7 operates in a similar manner as PWM type 6 except that the low side switches are not switched between on and off states as shown.

Figure 5:
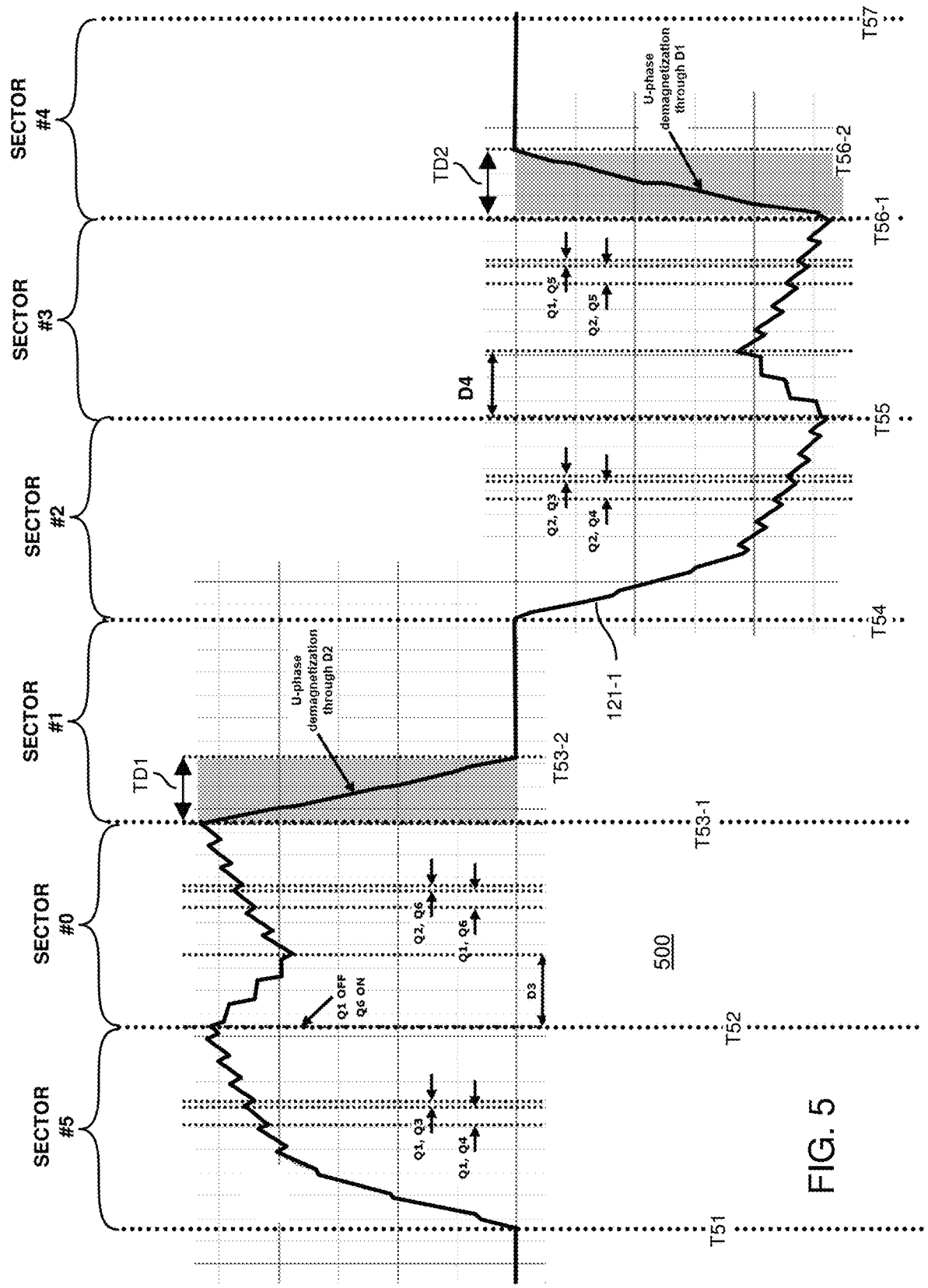
FIG. 5 is an example diagram illustrating balanced positive demagnetization of a winding and negative demagnetization of the winding in a respective control cycle.

FIG. 5 is an example diagram illustrating balanced positive demagnetization and negative demagnetization in a winding during a respective control cycle. The controller 140 balances positive demagnetization and negative demagnetization in a similar manner as shown in FIG. 5 for winding 131-1.

In this example, graph 500 (timing diagram) depicts the current 121-1 through winding 131-1 of motor 131 during a switching cycle of implementing the control signals associated with PWM pattern type 6. In a manner as previously discussed, the switching cycle includes operation in multiple sectors (including sector #0, second #1, second #2, sector #3, sector #4, and sector #5).

Further in this example, the controller 140 applies pattern 6 of pulse width modulation signals to control the winding 131-1. The PWM signals as discussed herein and applied to the switches in the inverter 170 include dead-time inserted between each PWM transition to prevent shoot-through current (that is, as is known in the art, dead time prevents shorting of the voltage Vbus to the ground reference voltage). In other words, high side switch circuitry and low side switch circuitry of a respective phase are not ON at the same time. The complementary switching of a respective high side switch and low side switch during each of the sectors of pattern 6 and 7 in a respective control cycle results in a sawtooth pattern as can be seen in current 121-1 through winding 131-1 as shown in graph 500.

With reference to graph 500, at the beginning of sector #5 (such as time T51), the current 121-1 through the winding 131-1 is substantially 0 amperes. Application of the pulse width modulation signals associated with sector #5 of PWM type 6 (see FIG. 4 for signals) between time T51 and T52 cause the magnitude of the current 121-1 to increase in a positive direction between time T51 at time T52.

Application of the pulse width modulation signals associated with sector #0 of PWM type 6 (see FIG. 4) between time T52 and T53-1 causes the magnitude of the current 121-1 to initially decrease and then increase between time T52 at time T53-1.

Application of the pulse width modulation signals associated with sector #1 of PWM type 6 (see FIG. 4) between time T53-1 and T54 causes the magnitude of the current 121-1 to decrease between time T53-1 at time T53-2. Positive demagnetization of the winding 131-1 (a.k.a., U winding) occurs between time T53-1 and T53-2 (having time duration TD1) based on application of the pulse width modulation switch control signals associated with sector #1 of PWM pattern type 6. Positive demagnetization of the winding 131-1 includes starting at a positive current 121-1 through the winding 131-1 at time T53-1 and reducing the magnitude of the current 121-1 through (and corresponding energy and magnetic flux stored in) the winding 131-1 from a peak at time T53-1 to substantially zero Amperes (and zero magnetic flux) at around T53-2. The current 131-1 and magnetic flux in winding 131-1 is substantially 0 amperes between time T53-2 and time T54.

At the beginning of sector #2 (such as time T54), the current 121-1 through the winding 131-1 is substantially 0 amperes. Application of the pulse width modulation signals associated with sector #2 of PWM type 6 (see FIG. 4) between time T54 and T55 causes the magnitude of the current 121-1 to increase (in a negative direction) between time T54 at time T55.

Application of the pulse width modulation signals associated with sector #3 of PWM type 6 (see FIG. 4) between time T55 and T56-1 causes the magnitude of the current 121-1 to initially decrease and then increase in a negative direction.

Application of the pulse width modulation signals associated with sector #4 of PWM pattern type 6 (see FIG. 4) between time T56-1 and T57 causes the magnitude of the current 121-1 to decrease between time T56-1 at time T57. In this example embodiment, so-called negative demagnetization of the winding 131-1 (a.k.a., U winding) occurs between time T56-1 and T56-2 (having time duration TD2) based on application of the pulse width modulation switch control signals associated with sector #4 of PWM pattern type 6. In one embodiment, negative demagnetization of the winding 131-1 includes starting at a peak negative current 121-1 through the winding 131-1 at or around time T56-1 and reducing the magnitude of the current 121-1 through (and corresponding energy stored in) the winding 131-1 from the peak current at time T56-1 to substantially zero Amperes at around T56-2.

Thus, implementations herein include the controller 140 receiving control input 104 indicating how to control operation of the motor 131. In one embodiment, the controller 140 uses the control input 104 as a basis in which to determine how to control the respective duty cycle of pulse width modulation signals driving the switches in the inverter 170. In accordance with the control input 104, the controller 140 controls a corresponding flow of current 121-1, 121-2, and 121-3, through each of multiple windings 131-1, 131-2, and 131-3 of the motor 131 using pulse width modulation pattern 6 or 7. While controlling the corresponding flow of current through each of multiple windings, the controller 140 balances positive demagnetization and negative demagnetization of each of the multiple windings in each respective control cycle of multiple control cycles. In other words, in a similar manner as previously discussed with respect to controlling the winding 131-1, the controller 140 applies the novel PWM control signals (such as PWM pattern type 6 control signals or PWM pattern type 7 control signals) to equalize the time duration TD1 of the positive demagnetization and the time duration TD2 of the negative demagnetization for each of the windings in motor 131 over a respective control cycle.

Note that the time duration TD1 is not exactly equal to but is substantially equal to the time duration TD2 due to variations in circuit parameters but within a threshold value of each other such as X %, where X is any integer value between 1 and 20. In other words, the controller 140 may control the TD2 to fall in a range between (1+X %)×TD1 and (1−X %)×TD1. Thus, the controller 140 can be configured to control a duration TD1 of the positive demagnetization (decreasing a magnitude of positive magnetic flux in the winding 131-1 to zero) and a duration TD2 of the negative demagnetization (decreasing a magnitude of negative magnetic flux in the winding 131-1 to zero) of each of the multiple windings in the respective control cycle to be within a threshold value of each other.

As a further example, the controller can be configured to control a first rate such as RATE1 (volts per second) of the positive demagnetization between time T53-1 and time T53-2 and a second rate such as RATE2 (volts per second) of the negative demagnetization between time T56-1 and T56-2 of each of the multiple windings in the respective control cycle to be within a threshold value such as X % (such as between 1% and 20%) or other suitable value of each other. In other words, RATE2 falls in a range between (1+X %)×RATE1 and (1−X %)×RATE1, or vice versa.

Thus, as previously discussed, implementation of the pulse width modulation controls signal patterns 6 or pattern 7 advantageously results in substantially equalizing a time duration TD1 of the positive demagnetization to a duration TD2 of the negative demagnetization of each of the multiple windings in the respective control cycle.

Note again that, in addition to supporting substantial equalizing of the positive demagnetization and negative demagnetization operations as discussed herein, implementation of the pulse width modulation patterns 6 and 7 via the controller results in controlling current through each of the multiple windings 131-1, 131-2, and 131-3 of the motor 131 such that an average magnitude of the current 121-1, 121-2, and 121-3 through each of the multiple windings is substantially equal during the respective control cycle.

As previously discussed, implementation of pulse width modulation and substantial equalization of the positive demagnetization time and negative demagnetization time (as well as providing a faster positive and negative demagnetization times over conventional techniques) as discussed herein provides beneficial operation such as one or more of the following: i) evenly distributed power dissipation amongst high side switch and low side switch on each motor phase, ii) during commutation (switch from one PWM sector to another), demagnetization time of non-excited phases becomes shorter, which helps reduce power loss, iii) during commutation, current rising time of new excited phase becomes shorter, which helps increase BLDC motor control efficiency.

Figure 6:
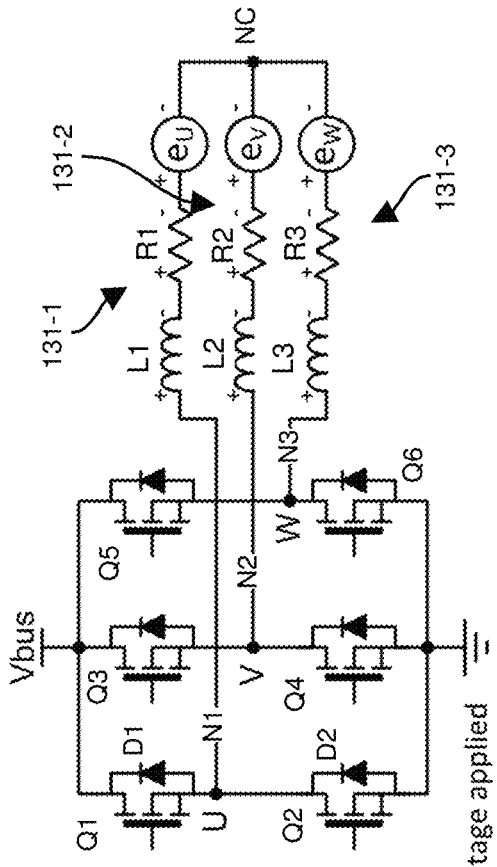
FIG. 6 is an example model illustrating components of a respective motor driver and corresponding windings in a motor.

FIG. 6 is an example model illustrating components of a respective motor driver and corresponding windings in a motor.

As shown in FIG. 6, the winding 131-1 is modeled to include an inductance L1, resistance R1, and voltage source Eu for back EMF voltage; the winding 131-2 is modeled to include an inductance L2, resistance R2, and voltage source Ev for back EMF voltage, the winding 131-3 is modeled to include an inductance L3, resistance R3, and voltage source Ew for back EMF voltage. In this example, L1=L2=L3; R1=R2=R3.

FIG. 7A is an example diagram illustrating operation of the motor in sector #1 during positive demagnetization.

The graph 710 of FIG. 7A illustrates current through the winding 131-1 (U-winding) and presence of a back electromagnetic force (emf) voltage. For example, for winding 131-1 (a.k.a., U-winding), positive current demagnetization happens at the beginning of the PWM sector 1 (around time T53-1 in FIG. 5). At that time, the winding 131-1 (U-winding) phase current starts with positive Im (a.k.a., current 121-1) and then decreases to 0 (e.g., the V phase starts with 0 current and then increases to IM; W phase current stays in negative current−Im).

In an ideal the BLDC motor control condition, the rotor back EMF voltage angle is at 60 degrees. Assuming the back EMF to be sinusoidal voltage, the back EMF on each phase is as follows:

$$Eu=Vemf*\cos(-60\ degs)=0.5\ Vemf$$

$$Ev=Vemf*\cos(60\ degs)=0.5\ Vemf$$

$$Ew=Vemf*\cos(180\ degs)=-Vemf$$

FIG. 7B is an example diagram illustrating implementation of a conventional pulse width modulation drive pattern during sector #1. Implementation of the pulse width modulation patterns 0, 1, 4, and 5 result in slow demagnetization in sector #1.

For example, the inverter 170 output for sector #1 (for patterns 0, 1, 4, and 5) and respective voltages of nodes is as follows:

Vu=0, where Vu is the voltage at node N1 of the motor 131; during sector #1, the inherent diode D2 of switch Q2 effectively connects node N1 to the ground reference voltage (current 121-1 flows from the ground reference voltage through diode D2 to node N1);

Vv=Vbus*D, Vv is the voltage at node N2 of the motor 131 and D is the duty cycle of controlling switches Q3 and Q4; during sector #1, per patterns 0, 1, 4, 5, the switches Q3 and Q4 are modulated in a manner as previously discussed; and Vw=0, where Vw is the voltage at node N3 of the motor 131, during sector #1, the switch Q6 is ON setting node N3 to the ground reference voltage.

Thus, the voltage Vnc=Vbus*D/3, where the voltage Vnc is a magnitude of the voltage at the common node NC of the motor 131.

The voltage Vlu across the node N1 and NC of the winding 131-1 (U-winding) in sector #1 is as follows:

Vlu=0−Vnc=0−Vbus*D/3−Eu−Im*R1<0, Vbus is a DC voltage, where R1 is a resistance of the winding 131-1, Eu=Vemf*cos(−60 degs)=0.5 Vemf.

Since Vbus, Eu, and Im are positive values in this case, the voltage Vlu across the first node N1 and node NC of the winding 131-1 is negative, resulting in a decrease of the magnitude of the current 121-1 to zero.

FIG. 7C is an example diagram illustrating implementation of a pulse width modulation drive pattern during sector #1.

Implementation of the pulse width modulation patterns 2, 3, 6, and 7 results in a shorter positive demagnetization time duration (faster demagnetization) in sector #1 than positive for patterns 0, 1, 4, and 5.

For example, the inverter 170 output for sector #1 (for patterns 2, 3, 6, and 7) is as follows:

Vu=0, where Vu is the voltage at node N1 of the motor 131; during sector #1, the inherent diode D2 of switch Q2 effectively connects node N1 of winding 131-1 to the ground reference voltage (current 121-1 flows from the ground reference voltage through diode D2 to node N1);

Vv=Vbus, where Vv is the voltage at node N2 of the motor 131, where activation of switch Q3 connects the node N2 to Vbus;

Vw=Vbus*(1-D), Vw is the voltage at node N3 of the motor 131 and where 1-D is the duty cycle of controlling switches Q5 and Q6.

Thus, the voltage Vnc=Vbus*(2/3-D/3), where the voltage Vnc is a magnitude of the voltage at the common node NC of the motor 131.

In this instance, the voltage Vlu across the winding 131-1 (U-winding) in sector #1 is as follows:

Vlu=0-Vnc=0-Vbus*(2/3-D/3)-Eu-Im*R1, Vbus is a DC voltage, where R1 is a resistance of the winding 131-1, Eu=Vemf*cos(-60 degs)=0.5 Vemf.

The voltage Vlu across the winding 131-1 is also negative in this case, and the magnitude of the current 121-1 through the winding 131-1 is greater in magnitude for sector #1 of patterns 2, 3, 6, and 7 than as in patterns 0, 1, 4, and 5. For example, assuming that D=60% or 0.6, the term [-Vbus*(2/3-D/3)] is a greater negative value (or magnitude) than [-Vbus*D/3]. Thus, positive demagnetization occurs quicker for patterns 2, 3, 6, and 7, resulting in a shorter time duration TD1 in sector #1 for patterns 2, 3, 6, and 7 than for pattern 0, 1, 4, and 5.

Thus, for positive demagnetization associated with patterns 6 and 7, the controller 140: i) deactivates switches Q1 and Q2 coupled to a node N1 of the first winding 131-1 to decrease a magnitude of magnetic flux in the first winding 131-1 to zero between time T53-1 and T53-2; ii) applies a bus voltage Vbus to a node of the second winding 131-2 via activation of switch Q3; and iii) via switches Q5 and Q6, switches between applying the bus voltage Vbus to a node N3 of the third winding 131-3 and applying a ground reference voltage associated with the bus voltage to the node N3 of the third winding 131 in accordance with a first duty cycle D.

Figure 8B:
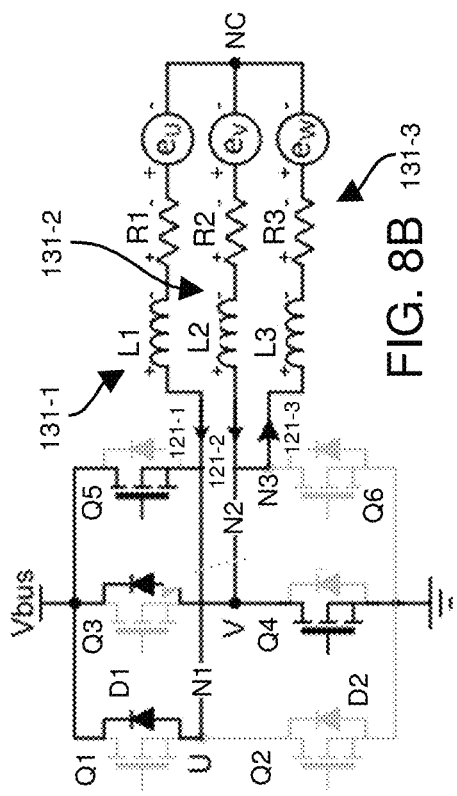
FIG. 8B is an example diagram illustrating implementation of a conventional pulse width modulation drive pattern.
Figure 8C:
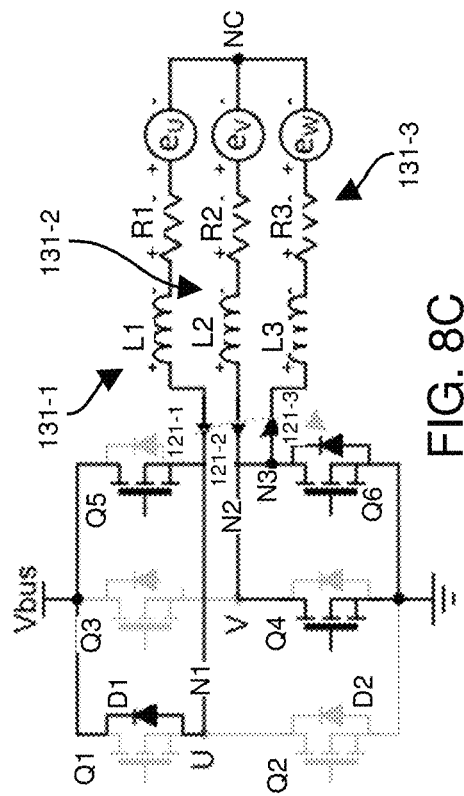
FIG. 8C is an example diagram illustrating implementation of a pulse width modulation drive pattern.
Figure 8A:
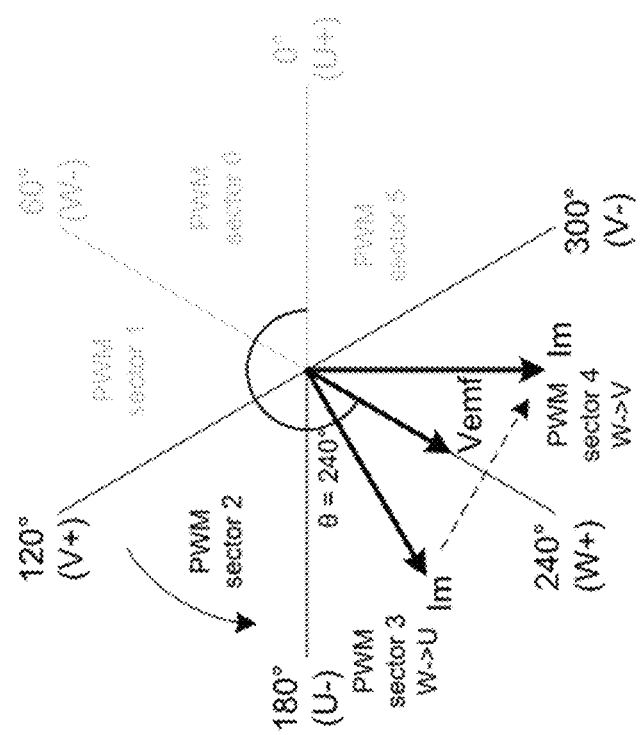
FIG. 8A is an example diagram illustrating operation of the motor during positive demagnetization.

FIG. 8A is an example diagram illustrating operation of the motor in sector #1 during positive demagnetization.

The graph 810 in FIG. 8A illustrates negative current through the winding 131-1 (U-winding) and presence of a back electro-magnetic force (emf) voltage. For example, for winding 131-1 (a.k.a., U-winding), negative current/magnetic flux demagnetization happens at the beginning of the PWM sector #4 (around time T56-1 in FIG. 5). At that time, the winding 131-1 (U-winding) phase current starts with negative Im (a.k.a., current 121-1) and then increases to 0 (e.g., the V winding 131-2 starts with 0 current and then decreases to -Im; the W phase current stays at positive current Im).

In an ideal the BLDC motor control condition, the rotor back EMF voltage angle of the motor 131 is at 240 degrees. Assuming the back EMF to be sinusoidal voltage, the back EMF on each phase is as follows:

*Eu*=Vemf*cos(120 degs)=-0.5 Vemf

*Ev*=Vemf*cos(240 degs)=-0.5 Vemf

*Ew*=Vemf*cos(0 degs)=Vemf

FIG. 8B is an example diagram illustrating implementation of a conventional pulse width modulation drive pattern during sector #4.

Implementation of the pulse width modulation patterns 2, 3, 4, and 5 result in a slow demagnetization in sector #1.

For example, the inverter 170 output for sector #4 (for patterns 2, 3, 4, and 5) is as follows:

Vu=Vbus, where Vu is the voltage at node N1 of the motor 131; current 121-1 passes through inherent diode D1 of the switch Q1;

Vv=Vbus*(1-D), Vv is the voltage at node N2 of the motor 131 and where 1-D is the duty cycle of controlling switches Q3 and Q4, and Vw=Vbus, where Vw is the voltage at node N3 of the motor 131; switch Q5 is ON.

Thus, the voltage Vnc=Vbus*(1-D/3), where the voltage Vnc is a magnitude of the voltage at the common node NC of the motor 131.

The voltage Vlu across the winding 131-1 (U-winding) in sector #1 is as follows:

Vlu=Vbus-Vnc=Vbus*D/3-Eu-Im*R1, Vbus is a DC voltage, where R1 is a resistance of the winding 131-1, Eu=Vemf*cos(120 degs)=-0.5 Vemf.

Since Vbus is a positive value, and Eu and Im are negative values in this case, the voltage Vlu across the first node N1 and second node NC of the winding 131-1 is positive, resulting in an increase of the magnitude of the negative current 121-1 to zero.

FIG. 8C is an example diagram illustrating implementation of a pulse width modulation drive pattern during sector #1.

Implementation of the pulse width modulation patterns 0, 1, 6, and 7 results in a faster positive demagnetization time in sector #1 than patterns 0, 1, 6, and 7.

For example, the inverter 170 output for sector #1 (for patterns 0, 1, 6, and 7) is as follows:

Vu=Vbus, where Vu is the voltage at node N1 of the motor 131; current 121-1 passes from node N1 through inherent diode D1 of the switch Q1 to Vbus;

Vv=0, where Vv is the voltage at node N2 of the motor 131; switch Q4 is ON, and Vw=Vbus*D, Vw is the voltage at node N3 of the motor 131 and where D is the duty cycle of controlling switches Q5 and Q6.

Thus, the voltage Vnc=Vbus*(1/3+D/3), where the voltage Vnc is a magnitude of the voltage at the common node NC of the motor 131.

The voltage Vlu across the winding 131-1 (U-winding) in sector #1 is as follows:

Vlu=Vbus-Vnc=Vbus*(2/3-D/3)-Eu-Im*R1>0, Vbus is a DC voltage, where R1 is a resistance of the winding 131-1, Eu=Vemf*cos(120 degs)=-0.5 Vemf.

Thus, during the negative demagnetization of the first winding 131-1, the controller 140: i) deactivates the switches Q1 and Q2 coupled to the node N1 of the first winding 131-1 to decrease the magnitude of magnetic flux in the first winding 131-1 to zero; ii) applies the ground reference voltage to the node N2 of the second winding 131-2 via activation of the switch Q4; and iii) switches between applying the bus voltage Vbus to the node N3 of the third winding 131-3 and applying the ground reference voltage to the second node N3 of the third winding 131-3 in accordance with a second duty cycle (1-D).

The voltage Vlu across the winding 131-1 is also negative, and the magnitude of the current 121-1 through the winding 131-1 is greater in magnitude for sector #1 of patterns 0, 1, 6, and 7 than as in patterns 2, 3, 4, and 5. For example, the term Vbus*(2/3–D/3) is a greater negative value than Vbus*D/3. Thus, negative demagnetization occurs quicker for patterns 0, 1, 6, and 7, resulting in a shorter time duration TD2 in sector #1 for patterns 0, 1, 6, and 7 than demagnetization times for patterns 2, 3, 4, and 5.

Accordingly, each of the multiple windings of the motor 131 are electrically connected to a common node NC. The controller 140 controls a magnitude of a voltage across a first winding 131-1 of the multiple windings to a first value (such as –Vbus*D/3) during positive demagnetization of the first winding 131-1 in the respective control cycle; the controller 131-1 controls a magnitude of the voltage across the first winding to a second value (such as Vbus*D/3) during negative demagnetization of the first winding 131-1. A magnitude of the second value may be substantially equal to a magnitude of the first value such that time duration TD1 is substantially equal to the time duration TD2.

Figure 9:
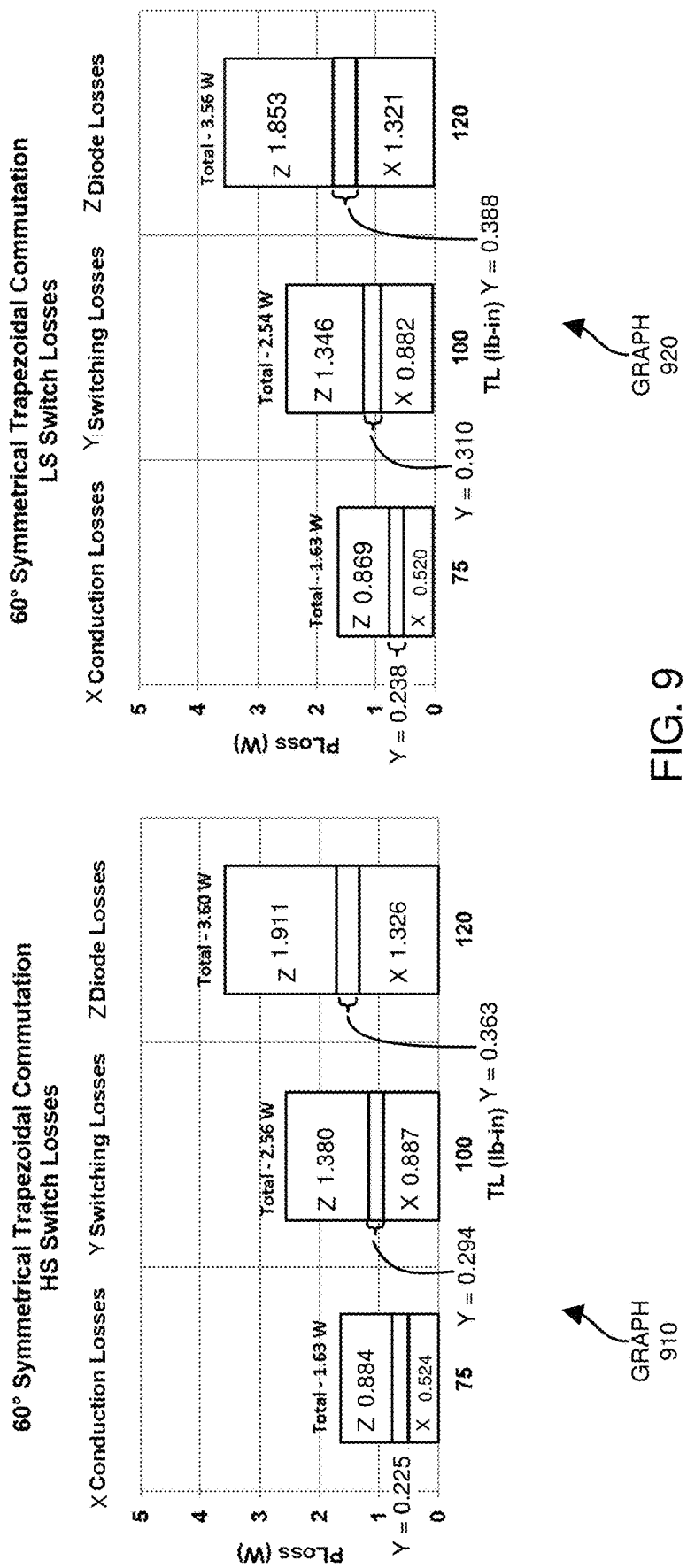
FIG. 9 is an example diagram illustrating high side switch circuitry and low side switch circuitry losses at different torque settings of the motor.

FIG. 9 is an example diagram illustrating high side switch circuitry and low side switch circuitry losses at different torque settings of the motor during application of PWM type 6.

Graph 910 illustrates different power losses associated with high side switch circuitry (such as switches Q1, Q3, and Q5) at different torque loads of the motor 131. For example, in a manner as previously discussed, the controller 140 implements the pulse width modulation pattern associated with PWM pattern type 6 or 7 to control operation of the motor 131. X represents power conduction losses of operating the respective switches Q1, Q3, and Q5; Y represents power switching losses of operating the respective switches Q1, Q3, and Q5; Z represents diode losses (power loss from inherent diodes associated with) switches Q1, Q3, and Q5.

Graph 920 illustrates different power losses associated with low side switch circuitry (such as switches Q2, Q4, and Q6) at different torque loads of the motor 131. For example, in a manner as previously discussed, the controller 140 implements the pulse width modulation pattern associated with PWM type 6 to control operation of the motor 131. X represents power conduction losses of operating the respective switches Q2, Q4, and Q6; Y represents power switching losses of operating the respective switches Q2, Q4, and Q6; Z represents diode losses (power loss from inherent diodes associated with) switches Q2, Q4, and Q6.

Figure 10:
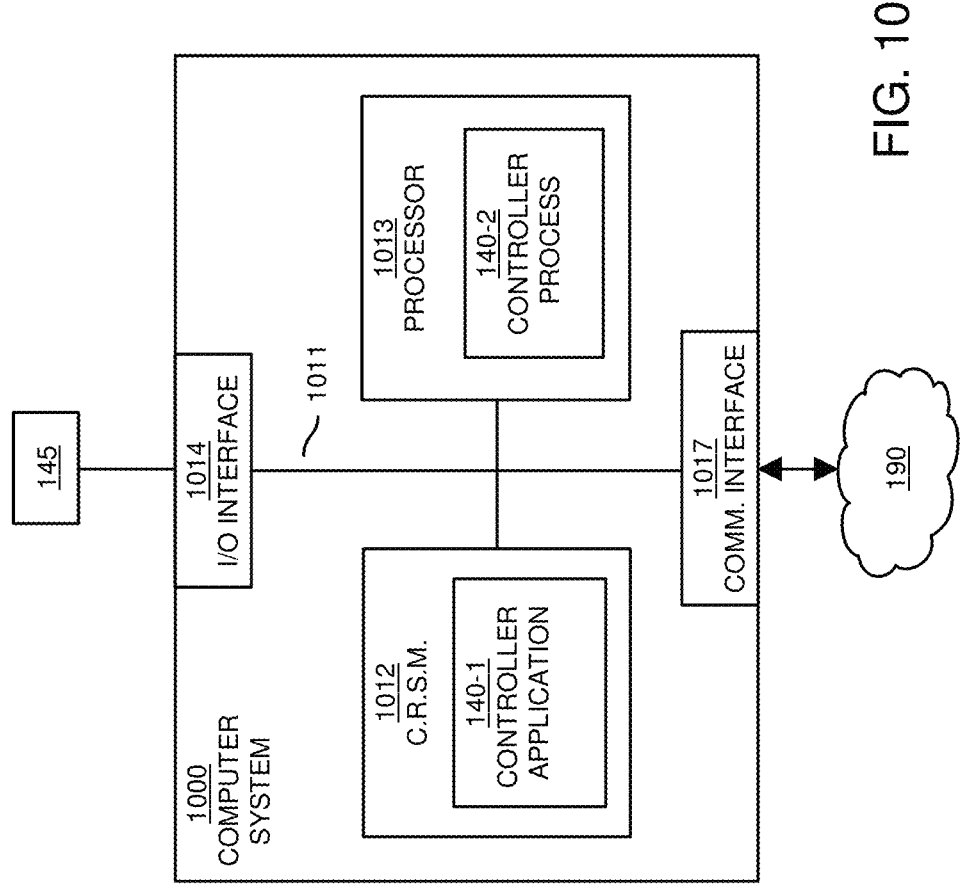
FIG. 10 is an example diagram illustrating computer processor hardware and related software instructions that execute methods as described herein.

As previously discussed, implementation of the PWM type 6 or PWM type 7 control patterns (of FIG. 4) results in balancing (or equalizing) of positive demagnetization and negative demagnetization of one or more windings of motor 131 in each control cycle of operating the motor 131. As shown by graph 1010 and graph 1020, implementation of these control patterns (PWM type 6 or PWM type 7) and corresponding balancing results in substantially equal power losses with respect to high side switch circuitry (switches Q1, Q3, and Q5) and low side switch circuitry (switches Q2, Q4, Q6). The balance of power losses as shown in FIG. 10 reduces stress on the switches because it is balanced as opposed to an imbalance of heat being dissipated mostly by high side switch circuitry or low side switch circuitry. More specifically, at a torque of around 75 inch-pounds, the total power loss power of high side switch circuitry (Q1, Q3, and Q5) is 1.63 watts (X=0.524, Y=0.225, Z=0.884), which is substantially equal to the total power loss power of low side switch circuitry (Q2, Q4, and Q6) is 1.63 watts (X=0.520, Y=0.238, Z=0.869).

At a torque of around 100 inch-pounds, the total power loss power of high side switch circuitry (Q1, Q3, and Q5) is 2.56 watts (X=0.887, Y=0.294, Z=1.380), which is substantially equal to the total power loss power of low side switch circuitry (Q2, Q4, and Q6) is 2.54 watts (X=0.882, Y=0.310, Z=1.346).

At a torque of around 120 inch-pounds, the total power loss power of high side switch circuitry (Q1, Q3, and Q5) is 3.60 watts (X=1.326, Y=0.363, Z=1.911), which is substantially equal to the total power loss power of low side switch circuitry (Q2, Q4, and Q6) is 3.56 watts (X=1.321, Y=0.388, Z=1.853).

FIG. 10 is an example block diagram of a computer device for implementing any of the operations as discussed herein.

As shown, computer system 1000 (such as implemented by any of one or more resources such as controller 140, signal generator 145, etc.) of the present example includes an interconnect 1011 that couples computer readable storage media 1012 such as a non-transitory type of media (or hardware storage media) in which digital information can be stored and retrieved, a processor 1013 (e.g., computer processor hardware such as one or more processor devices), I/O interface 1014, and a communications interface 1017.

I/O interface 1014 provides connectivity to any suitable circuitry or component such as user interface 115, winding 131, amplifier 145, etc.

Computer readable storage medium 1012 can be any hardware storage resource or device such as memory, optical storage, hard drive, floppy disk, etc. The computer readable storage medium 1012 can be configured to store instructions and/or data used by the controller application 140-1 to perform any of the operations as described herein.

Further in this example, communications interface 1017 enables the computer system 1000 and processor 1013 to communicate over a resource such as network 190 to retrieve information from remote sources and communicate with other computers.

As shown, computer readable storage media 1012 is encoded with controller application 140-1 (e.g., software, firmware, etc.) executed by processor 1013. Controller application 140-1 can be configured to include instructions to implement any of the operations as discussed herein.

During operation, processor 1013 accesses computer readable storage media 1012 via the use of interconnect 1011 in order to launch, run, execute, interpret or otherwise perform the instructions in controller application 140-1 stored on computer readable storage medium 1012.

Execution of the controller application 140-1 produces processing functionality such as controller process 140-2 in processor 1013. In other words, the controller process 140-2 associated with processor 1013 represents one or more aspects of executing controller application 140-1 within or upon the processor 1013 in the computer system 1000.

Note that computer system 1000 can be a micro-controller device, logic, hardware processor, hybrid analog/digital circuitry, etc., configured to control a power supply and perform any of the operations as described herein.

Functionality supported by the different resources will now be discussed via flowchart 1100 in FIG. 11. Note that the steps in the flowcharts below can be executed in any suitable order.

Figure 11:
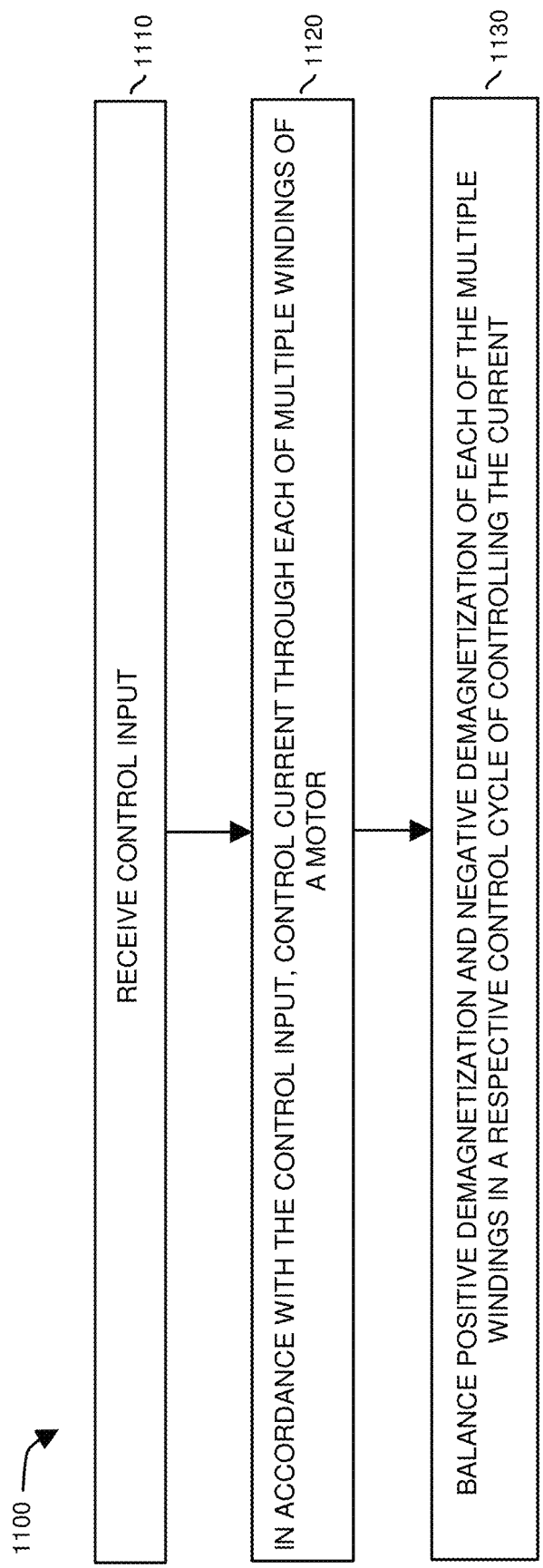
FIG. 11 is an example diagram illustrating a method as discussed herein.

FIG. 11 is an example diagram illustrating a method of controlling a power converter.

In processing operation 1110, the controller 140 receives control input 104.

In processing operation 1120, in accordance with the control input 104, the controller 140 controls current through each of the multiple windings 131-1, 131-2, and 131-3 of motor 131.

In processing operation, via generation of control signals 105 and pulse width modulation signals (such as associated with the PWM type 6 and PWM type 7), as discussed herein, the controller 140 balances positive demagnetization and negative demagnetization of each of the multiple windings of the motor 131 in a respective control cycle of controlling the current.

FIG. 12 is an example diagram illustrating assembly of a control system (such as a circuit).

As shown, assembler 1240 receives a substrate 1210 and corresponding components of system 100 such as one or more of controller 140, signal generator 145, inverter 170 (such as one or more sets of switches), etc. The assembler 1240 affixes (couples) components associated with the controller 140 and other components such as signal generator 145, inverter 170, etc., to the substrate 1210.

Via one or more respective circuit paths (such as traces, cables, wiring, etc.) as described herein, the fabricator 1240 provides connectivity between one or more components such as controller 140, signal generator 145, inverter 170, etc. Note further that components such as the signal generator 145, inverter 170, etc., can be affixed or coupled to the substrate 1210 in any suitable manner. For example, one or more of the components in motor system 100 can be soldered to the substrate 1210, inserted into sockets disposed on the substrate 1210, etc.

Additionally, note that the substrate 1210 is optional. Any of one or more circuit paths or connectivity as shown in the above drawings and as described herein can be disposed in cables, flexible substrates, or other suitable media.

The motor 131 is disposed on its own assembly independent of substrate 1210; the substrate or housing of the motor 131 is directly or indirectly connected to the substrate 1210 via wires, cables, links, etc. The controller 140 or any portion of the motor system 100 can be disposed on a standalone smaller board plugged into a socket of the substrate 1210 as well.

As previously discussed, via one or more circuit paths 1222 (such as one or more traces, cables, connectors, wires, conductors, electrically conductive paths, etc.), the assembler 1240 couples the system 100 and corresponding components to the motor 131 and corresponding windings. The circuit path 1222 conveys current 121-1, 121-2, 121-3, etc., from an input voltage source such as Vbus and ground reference voltage to the motor 131 as controlled by switches in inverter 170.

Accordingly, this disclosure includes a system comprising: a substrate 1210 (such as a circuit board, standalone board, mother board, standalone board destined to be coupled to a mother board, host, etc.); a system 100 of corresponding components (such as associated with controller 140, signal generator 145, inverter 170, etc.) as described herein; and at least one winding (such as a motor, winding, etc.).

Note again that techniques herein are well suited for use in circuit applications such as those that control supply current to multiple motor windings. However, it should be noted that the concepts in this disclosure are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

It will be understood by those skilled in the art that various changes in form and details may be made therein without departing from the spirit and scope of the present application as defined by the appended claims. Such variations are intended to be covered by the scope of this present application. As such, the foregoing description of the present application is not intended to be limiting. Rather, any limitations to the invention are presented in the following claims.

The invention claimed is:

1. An apparatus comprising:
a controller operative to:
receive control input;
in accordance with the control input, control current through each of multiple windings of a motor; and
balance positive demagnetization and negative demagnetization of at least one winding of the multiple windings in a respective control cycle of controlling the current;
wherein the multiple windings include a first winding, a second winding, and a third winding;
wherein the at least one winding is the first winding;
wherein the controller is further operative to, during the positive demagnetization of the first winding:
i) deactivate switches coupled to a node of the first winding;
ii) apply a bus voltage to a node of the second winding; and
iii) switch between applying the bus voltage to a node of the third winding and applying a reference voltage associated with the bus voltage to the node of the third winding in accordance with a first duty cycle.

2. The apparatus as in claim 1, wherein the controller is further operative to control a rate of the positive demagnetization and a rate of the negative demagnetization of the at least one winding in the respective control cycle to be substantially equal to each other.

3. The apparatus as in claim 1, wherein the controller is further operative to control a duration of the positive demagnetization and a duration of the negative demagnetization of the at least one winding in the respective control cycle to be substantially equal to each other.

4. The apparatus as in claim 1, wherein the controller is further operative to substantially equalize a duration of the positive demagnetization to a duration of the negative demagnetization of the at least one winding in the respective control cycle;
wherein positive demagnetization includes deactivating the switches coupled to the node of the first winding to an OPEN state to decrease a magnitude of current in the at least one winding to zero; and
wherein negative demagnetization includes deactivating the switches coupled to the node of the first winding to an OPEN state to increase a magnitude of current in the at least one winding to zero.

5. The apparatus as in claim 1, wherein the controller is further operative to control current through each of the multiple windings of the motor such that an average magnitude of the current through each of the multiple windings is substantially equal during the respective control cycle.

6. The apparatus as in claim 1, wherein each of the multiple windings are electrically connected to a common node;
wherein the controller is further operative to control a magnitude of a voltage across the first winding to a first value during positive demagnetization of the first winding in the respective control cycle, the positive demagnetization including reducing a magnitude of magnetic flux in the first winding to zero; and
wherein the controller is further operative to control the magnitude of the voltage across the first winding to a second value during negative demagnetization of the first winding, the negative demagnetization including reducing the magnitude of magnetic flux in the first winding to zero, a magnitude of the second value substantially equal to a magnitude of the first value.

7. The apparatus as in claim 1, wherein balance of the positive demagnetization and the negative demagnetization of each of the multiple windings in the respective control cycle equalizes a first power loss associated with high side switch circuitry and a second power loss associated with low side switch circuitry, the high side switch circuitry and the low side switch circuitry controlled by the controller to provide the current through the at least one winding of the motor in the respective control cycle.

8. The apparatus as in claim 1 further comprising:
multiple current drivers, each of the multiple current drivers including high side switch circuitry and low side switch circuitry controlled by the controller and operative to supply the current through each of the multiple windings of the motor.

9. The apparatus as in claim 1,
wherein a first node of the first winding, a first node of the second winding, and a first node of the third winding are electrically connected to each other.

10. The apparatus as in claim 1, wherein the controller is further operative to, during the negative demagnetization of the first winding:
iv) deactivate the switches coupled to the node of the first winding;
v) apply the reference voltage to the node of the second winding; and
vi) switch between applying the bus voltage to the node of the third winding and applying the reference voltage to the node of the third winding in accordance with a second duty cycle.

11. The apparatus as in claim 10, wherein deactivation of the switches coupled to the first winding during the positive demagnetization causes an inherent diode of a first switch of the switches to provide electrical connectivity of the node of the first winding to the reference voltage during the positive demagnetization of the first winding;
wherein deactivation of the switches coupled to the first winding during the negative demagnetization causes an inherent diode of a second switch of the switches to provide electrical connectivity of the node of the first winding to the bus voltage during the negative demagnetization of the first winding; and
wherein the first switch and the second switch are connected in series between a first voltage source supplying the bus voltage and a second voltage source supplying the reference voltage.

12. The apparatus as in claim 1, wherein the positive demagnetization includes reducing a magnitude of magnetic flux in the at least one winding to zero via the controller deactivating the switches coupled to the node of the first winding; and
wherein the negative demagnetization includes reducing a magnitude of magnetic flux in the at least one winding to zero via the controller deactivating the switches coupled to the node of the first winding.

13. A system comprising:
a circuit substrate;
the apparatus of claim 1 coupled to the circuit substrate.

14. A method comprising:
receiving control input;
in accordance with the control input, controlling current through each of multiple windings of a motor; and
balancing positive demagnetization and negative demagnetization of at least one winding of the multiple windings in a respective control cycle of controlling the current;
wherein the multiple windings include a first winding, a second winding, and a third winding;
wherein the at least one winding is the first winding;
the method further comprising: during the positive demagnetization of the first winding;
i) deactivating switches coupled to a node of the first winding;
ii) applying a bus voltage to a node of the second winding; and
iii) switching between applying the bus voltage to a node of the third winding and applying a reference voltage associated with the bus voltage to the node of the third winding in accordance with a first duty cycle.

15. The apparatus as in claim 1,
wherein the controller is further operative to control a magnitude of a first time duration of implementing the negative demagnetization of the at least one winding in the respective control cycle to be within a threshold value of 5% of a magnitude of a second duration of implementing the positive demagnetization.

16. The method as in claim 14 further comprising:
during the negative demagnetization of the first winding:
i) deactivating the switches coupled to the node of the first winding; ii) applying the reference voltage to the node of the second winding; and iii) switching between applying the bus voltage to the node of the third winding and applying the reference voltage to the node of the third winding in accordance with a second duty cycle.

17. The method as in claim 16, wherein deactivation of the switches coupled to the first winding during the positive demagnetization causes an inherent diode of a first switch of the switches to provide electrical connectivity of the node of the first winding to the reference voltage during the positive demagnetization of the first winding;
wherein deactivation of the switches coupled to the first winding during the negative demagnetization causes an inherent diode of a second switch of the switches to provide electrical connectivity of the node of the first winding to the bus voltage during the negative demagnetization of the first winding; and
wherein the first switch and the second switch are connected in series between a first voltage source supplying the bus voltage and a second voltage source supplying the reference voltage.

18. An apparatus comprising:
a controller operative to:
receive control input;
in accordance with the control input, control current through each of multiple windings of a motor; and
balance positive demagnetization and negative demagnetization of at least one winding of the multiple windings in a respective control cycle of controlling the current;
wherein balance of the positive demagnetization and the negative demagnetization of each of the multiple windings in the respective control cycle equalizes a first power loss associated with high side switch circuitry and a second power loss associated with low side switch circuitry, the high side switch circuitry and the low side switch circuitry controlled by the controller to provide the current through the at least one winding of the motor in the respective control cycle;
wherein the first power loss includes a summation of: i) first conduction power losses associated with the high-side switch circuitry, ii) first switching power losses associated with the high-side switch circuitry, and iii) first diode power losses associated with the high-side switch circuitry; and
wherein the second power loss includes a summation of: i) second conduction power losses associated with the low-side switch circuitry, ii) second switching power losses associated with the low-side switch circuitry, and iii) second diode power losses associated with the low-side switch circuitry.

19. The apparatus as in claim 18, wherein the balanced positive demagnetization and negative demagnetization substantially equalizes the first power loss and the second power loss.

20. The apparatus as in claim 1, wherein the switches include high side switch circuitry and low side switch circuitry; and
wherein the controller is operative to control switching operation of the high side switch circuitry and the low side switch circuitry coupled to the node of the first winding to control a first magnitude of current through the first winding, the controlled switching operation including equalizing a first total power loss associated with the high side switch circuitry and a second total power loss associated with the low side switch circuitry to balance the positive demagnetization and the negative demagnetization.

21. An apparatus comprising:
a controller operative to:
receive control input;
in accordance with the control input, control current through each of multiple windings of a motor; and
balance positive demagnetization and negative demagnetization of a first winding of the multiple windings in a respective control cycle of controlling the current;
wherein the controller is further operative to:
control high side switch circuitry and low side switch circuitry coupled to a node of the first winding during the respective control cycle to control first current through the first winding;
the respective control cycle including a first portion, a second portion, a third portion, a fourth portion, a fifth portion, and a sixth portion;
implement the positive demagnetization in the second portion of the respective control cycle via deactivation of the high side switch circuitry and deactivation of the low side switch circuitry;
control the high side switch circuitry and the low side switch circuitry to apply a constant voltage to the node of the first winding during the third portion of the respective control cycle;
control the high side switch circuitry and the low side switch circuitry to apply a variable voltage to the node of the first winding during the fourth portion of the respective control cycle;
implement the negative demagnetization in the fifth portion of the respective control cycle via deactivation of the high side switch circuitry and deactivation of the low side switch circuitry;
control the high side switch circuitry and the low side switch circuitry to apply a constant voltage to the node of the first winding during the sixth portion of the respective control cycle; and
control the high side switch circuitry and the low side switch circuitry to apply a variable voltage to the node of the first winding during the first portion of the respective control cycle.

22. An apparatus comprising:
a controller operative to:
receive control input;
in accordance with the control input, control current through each of multiple windings of a motor; and
balance positive demagnetization and negative demagnetization of a first winding of the multiple windings in a respective control cycle of controlling the current;
wherein the controller is further operative to:
control high side switch circuitry and low side switch circuitry coupled to a node of the first winding during the respective control cycle, the respective control cycle including a first portion, a second portion, a third portion, and a fourth portion;
the second portion and the third portion of the respective control cycle residing between the first portion and the fourth portion of the respective control cycle;
implement the positive demagnetization in the first portion of the respective control cycle;

implement the negative demagnetization in the fourth portion of the respective control cycle;

control the high side switch circuitry and the low side switch circuitry to apply a constant voltage to the node of the first winding during the second portion of the control cycle; and control the high side switch circuitry and the low side switch circuitry to apply a variable voltage to the node of the first winding during the third portion of the control cycle.

23. An apparatus comprising:

a controller operative to:

receive control input;

in accordance with the control input, control current through each of multiple windings of a motor; and balance positive demagnetization and negative demagnetization of the first winding of the multiple windings in a respective control cycle of controlling the current;

wherein the controller is further operative to:

control high side switch circuitry and low side switch circuitry coupled to a node of the first winding during the respective control cycle;

the respective control cycle including a first portion, a second portion, and a third portion;

control the high side switch circuitry and the low side switch circuitry to apply a constant voltage to the node of the first winding during the first portion of the control cycle;

implement the positive demagnetization in the second portion of the respective control cycle of controlling the magnitude of the current through the first winding; and control the high side switch circuitry and the low side switch circuitry to apply a variable voltage to the node of the first winding during the third portion of the control cycle.

* * * * *

UNITED STATES PATENT AND TRADEMARK OFFICE
CERTIFICATE OF CORRECTION

| | | |
|---|---|---|
| PATENT NO. | : 12,021,474 B2 | |
| APPLICATION NO. | : 17/522369 | |
| DATED | : June 25, 2024 | |
| INVENTOR(S) | : Wei Wu and Venkata Anand Prabhala | |

It is certified that error appears in the above-identified patent and that said Letters Patent is hereby corrected as shown below:

In the Claims

Claim 1, Line 16, replace ":" with --;--

Claim 14, Line 13, replace ";" with --:--

Signed and Sealed this
Twenty-ninth Day of October, 2024

*Katherine Kelly Vidal*

Katherine Kelly Vidal
*Director of the United States Patent and Trademark Office*